(12) United States Patent
Flohr et al.

(10) Patent No.: US 11,869,122 B2
(45) Date of Patent: Jan. 9, 2024

(54) METHOD FOR GENERATING AN IMAGE

(71) Applicant: Siemens Healthcare GmbH, Erlangen (DE)

(72) Inventors: Thomas Flohr, Uehlfeld (DE); Steffen Kappler, Effeltrich (DE)

(73) Assignee: Siemens Healthcare GmbH, Erlangen (DE)

( * ) Notice: Subject to any disclaimer, the term of this patent is extended or adjusted under 35 U.S.C. 154(b) by 145 days.

(21) Appl. No.: 17/545,247

(22) Filed: Dec. 8, 2021

(65) Prior Publication Data

US 2022/0101574 A1 Mar. 31, 2022

Related U.S. Application Data

(63) Continuation of application No. 15/145,943, filed on May 4, 2016, now Pat. No. 11,216,991.

(30) Foreign Application Priority Data

May 13, 2015 (DE) .......................... 102015208905.3

(51) Int. Cl.
*G06T 11/00* (2006.01)

(52) U.S. Cl.
CPC .......... *G06T 11/008* (2013.01); *G06T 11/006* (2013.01); *G06T 2211/408* (2013.01)

(58) Field of Classification Search
CPC .................................................... G06T 11/008
See application file for complete search history.

(56) References Cited

U.S. PATENT DOCUMENTS

| 5,355,309 A | 10/1994 | Eberhard et al. |
| 7,545,901 B2 | 6/2009 | Mistretta |

(Continued)

FOREIGN PATENT DOCUMENTS

| CN | 101248458 A | 8/2008 |
| CN | 102573643 A | 7/2012 |

(Continued)

OTHER PUBLICATIONS

Mitchell, Harvey B.: "Imagefusion: theories, techniques and applications.", 1. Auflage Berlin-Heidelberg: Springer, 2010. S.1, 219-227.—ISBN 978-3-642-11215-7.

(Continued)

*Primary Examiner* — David P Porta
*Assistant Examiner* — Shun Lee
(74) *Attorney, Agent, or Firm* — Harness, Dickey & Pierce, P.L.C.

(57) ABSTRACT

A method is disclosed for generating an image. An embodiment of the method includes detecting a first projection data set via a first group of detector units, the first group including a first plurality of first detector units, each having more than a given number of detector elements; detecting a second projection data set via a second group of detector units, the second group including a second plurality of second detector units, each including, at most, the given number of detector elements; reconstructing first image data based on the first projection data set; reconstructing second image data based on the second projection data set; and combining the first image data and the second image data. A non-transitory computer readable medium, a data processing unit, and an imaging device including the data processing unit are also disclosed.

20 Claims, 7 Drawing Sheets

(56) References Cited

U.S. PATENT DOCUMENTS

| | | |
|---|---|---|
| 7,916,836 B2 | 3/2011 | Tkaczyk et al. |
| 2006/0056581 A1 | 3/2006 | Hoffman et al. |
| 2007/0009080 A1 | 1/2007 | Mistretta |
| 2007/0010731 A1 | 1/2007 | Mistretta |
| 2011/0123081 A1 | 5/2011 | Sebok et al. |
| 2011/0123084 A1 | 5/2011 | Sebok |
| 2012/0301002 A1 | 11/2012 | Flohr et al. |
| 2012/0326049 A1 | 12/2012 | Hannemann et al. |
| 2013/0039556 A1 | 2/2013 | Kachelriess et al. |
| 2013/0223719 A1* | 8/2013 | Ohishi ............ A61B 17/12118 382/132 |

FOREIGN PATENT DOCUMENTS

| | | |
|---|---|---|
| CN | 102793555 A | 11/2012 |
| CN | 103190928 A | 7/2013 |
| CN | 104598909 A | 5/2015 |
| DE | 102011006188 A1 | 10/2012 |
| DE | 102011077859 B4 | 1/2014 |
| DE | 102012218374 A1 | 4/2014 |

OTHER PUBLICATIONS

Office Action for corresponding Chinese Application No. 2016103193132 dated Apr. 28, 2018, English translation thereof.
Heismann et al. Spectral Computed Tomography, pp. vii-ix (Year: 2012).

* cited by examiner

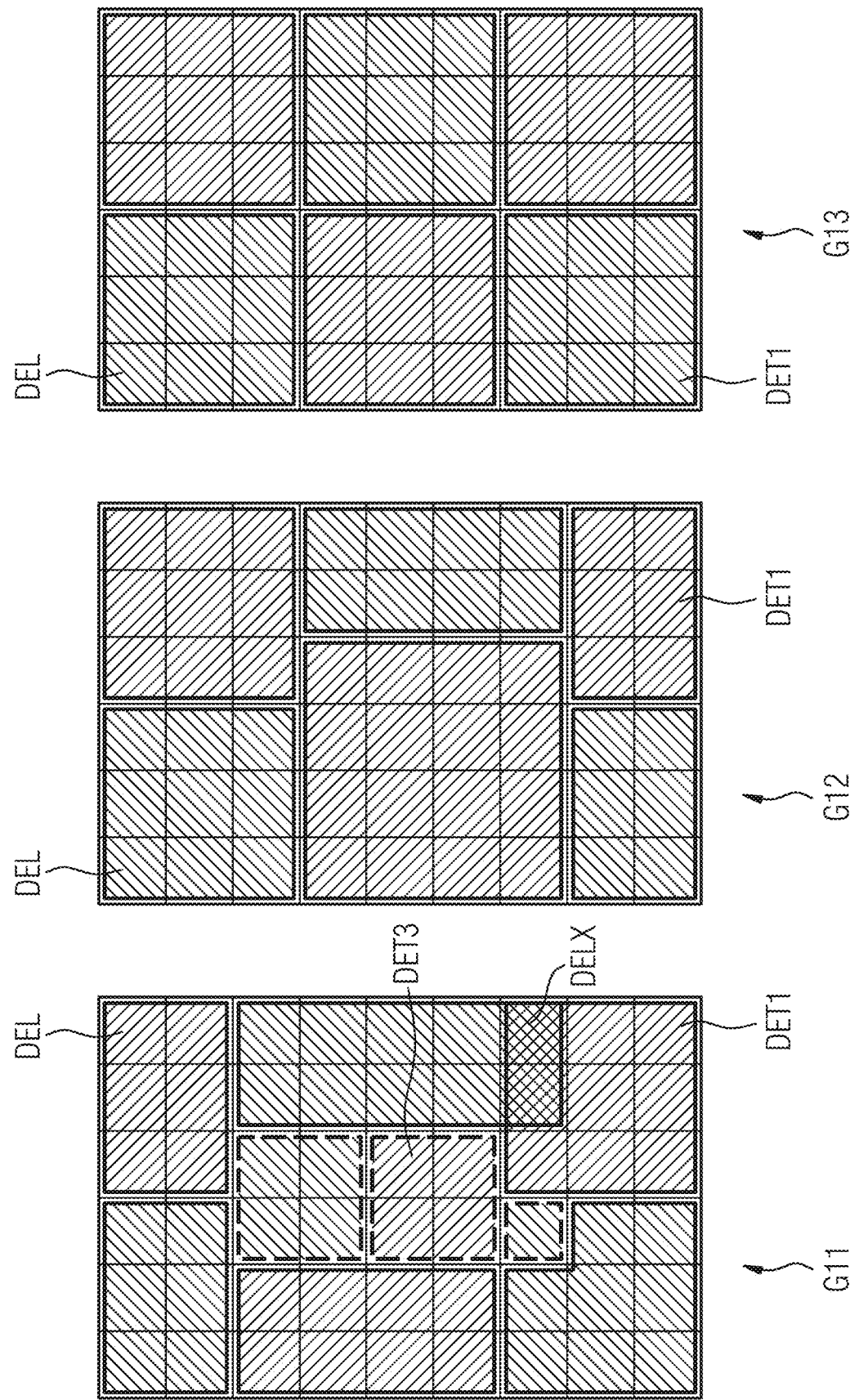

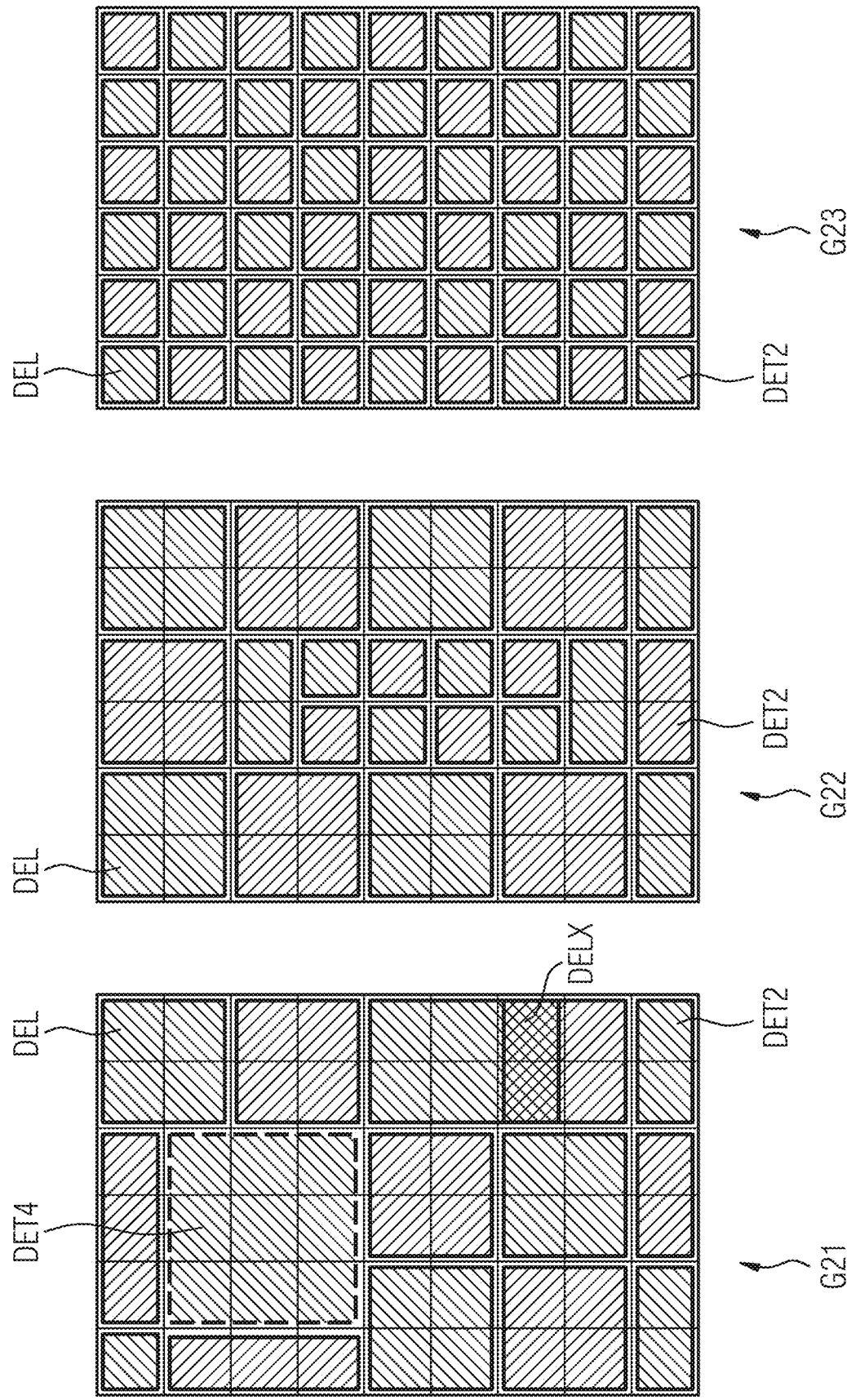

METHOD FOR GENERATING AN IMAGE

CROSS-REFERENCE TO RELATED APPLICATIONS

The present application is a Continuation of, and claims priority under 35 U.S.C. § 120 to, U.S. application Ser. No. 15/145,943, filed May 4, 2016, which claims priority under 35 U.S.C. § 119 to German Patent Application No. DE 102015208905.3, filed May 13, 2015, the entire contents of each of which are incorporated herein by reference.

FIELD

At least one embodiment of the invention generally relates to a method for generating an image of an object from a first projection data set detected with a first group of detector units and a second projection data set detected with a second group of detector units. At least one embodiment of the invention also generally relates to a data processing unit for generating an image of an object from a first projection data set detected with a first group of detector units and a second projection data set detected with a second group of detector units. At least one embodiment of the invention also generally relates to an imaging device, to a computer program product and to a computer-readable medium.

BACKGROUND

In imaging applications, in particular in computerized tomography, a detector can be used to detect a projection data set. When detecting a projection data set radiation quanta, for example X-ray quanta, which issue from a radiation source, for example an X-ray source, and penetrate a region of an object to be imaged, strike the detector. An image of the region of the object to be imaged can be generated based on the projection data set. A quantum-counting detector is designed for spatially resolved detection of radiation quanta. In particular, a quantum-counting detector enables detection of a projection data set as a function of the energy of incident radiation quanta. Since the interaction of radiation quanta with material is dependent on the energy of the radiation quanta, a quantum-counting detector offers many advantages in respect of the depiction and identification of structures of the object.

To detect the location of incidence of a radiation quantum a detector comprises a plurality of detector units. Each of these detector units can be respectively assigned to at least one location at which a radiation quantum can strike the detector. The flux density of the radiation quanta striking a detector unit can be very high, in particular if the radiation is not significantly attenuated by the object. To be able to achieve high accuracy when detecting the projection data set, in particular in a quantum counting detector, the number of radiation quanta registered by the detector unit during a given time segment must not, as a rule, exceed an admissible value. This admissible value can depend, for example, on the electronic device of the detector and on physical properties of the detector. For example, this admissible value can depend, inter alia, on the width of a current and/or voltage pulse which is provided when detecting a radiation quantum.

A detector unit can have one or more detector element(s). A detector unit, which has exactly one detector element, is also called subpixels. A detector unit, which has a plurality of detector elements, is also called macropixels. The projection surface of a detector element of a quantum counting detector is typically very small, for example, approximately square with 250 micrometer edge length. The admissible value can thereby be adhered to even with a high flux density of radiation quanta striking the detector. Furthermore, a very high spatial resolution can be attained thereby. In the example having a 250 micrometer edge length a spatial resolution can be achieved such that 40 pairs of lines per centimeter can be resolved. For example bone structures, in particular of the inner ear, or vessels can therefore be imaged with the spatial resolution of a flat panel detector used in conventional angiography.

Use of this spatial resolution can have an adverse effect on the spectral quality of the scan data. With a small edge length of the detector elements the spectral resolution of the radiation quanta registered in different energy ranges can be impaired by the increasing influence of physical effects. For example, in the case of charge sharing, i.e. the simultaneous detection of a radiation quantum in the two detector elements registered close to the boundary of two detector elements, detection of the energy of the radiation quantum is very inaccurate. Furthermore, smaller detector elements can have a signal stability that is reduced compared to larger detector elements, and/or increased noise owing to inhomogeneities in the detector material.

The choice of detector units, which have a plurality of detector elements, can therefore be advantageous for good spectral quality of the detector and disadvantageous for good spatial resolution of the detector.

A quantum-counting radiation detector is known from DE 10 2011 077 859 B4 in which detector elements are divided into groups of adjacent detector elements in order to form larger detector units.

SUMMARY

At least one embodiment enables generation of an image having improved spatial resolution and improved spectral quality.

At least one embodiment is directed to a method; at least one embodiment is directed to a data processing unit; at least one embodiment is directed to an imaging; at least one embodiment is directed to a computer program product; at least one embodiment is directed to a computer-readable medium. Further claims relate to advantageous embodiments of the invention.

In the inventive method of at least one embodiment for generating an image a first projection data set is detected via a first group of detector units and a second projection data set detected via a second group of detector units. The first group has a first plurality of first detector units, wherein the first detector units each have more than a given number of detector elements, wherein the first detector units are each designed for spectrally resolved detection of radiation quanta. The second group has a second plurality of second detector units, wherein the second detector units each have, at most, the given number of detector elements, wherein the second detector units are each designed for spectrally resolved detection of radiation quanta. First image data is reconstructed based on the first projection data set. Second image data is reconstructed based on the second projection data set. The first image data and the second image data are combined. In particular, the first image data and the second image data are combined to form the image.

An example embodiment of the inventive imaging device has a radiation source, a detector and an inventive data processing unit.

According to an embodiment of the invention, the detector has the first group of detector units and the second group of detector units. According to an embodiment of the invention the detector has a plurality of detector elements.

One embodiment of the invention provides that the method comprises the following steps:

detecting a first projection data set via a first group of detector units of a detector, wherein the first group has a first plurality of first detector units of the detector, wherein the first detector units of the detector each have more than a given number of detector elements of the detector, wherein the first detector units are each designed for spectrally resolved detection of radiation quanta, detecting a second projection data set via a second group of detector units of the detector, wherein the second group has a second plurality of second detector units of the detector, wherein the second detector units of the detector each have, at most, the given number of detector elements of the detector, wherein the second detector units are each designed for spectrally resolved detection of radiation quanta, reconstructing first image data based on the first projection data set, reconstructing second image data based on the second projection data set, and combining the first image data and the second image data.

According to an embodiment of the invention the detector is the detector of a single-source computer tomograph. In particular, an embodiment of the inventive imaging device can be a single-source computer tomograph.

According to a further embodiment of the invention the inventive imaging device has a first radiation source, a first detector interacting with the first radiation source, a second radiation source, a second detector interacting with the second radiation source and an embodiment of an inventive data processing unit. In particular, an embodiment of the inventive imaging device can be a dual-source computer tomograph.

According to one embodiment of the invention, a computer program product has a computer program which can be loaded directly into a data processing unit of an imaging device, having program sections in order to carry out all steps of an embodiment of the inventive method when the computer program is run in the data processing unit.

Program sections which can be read and executed by a data processing unit are stored on the inventive computer-readable medium in order to carry out all steps of an embodiment of an inventive method when the program sections are executed by the data processing unit.

BRIEF DESCRIPTION OF THE DRAWINGS

The invention will be illustrated again below with reference to the accompanying figures using example embodiments. The illustration in the figures is schematic and highly simplified and not necessarily to scale.

In the drawings:

FIG. 9 shows a first example, a second example and a third example for the first group of detector units, and FIG. 10 shows a first example, a second example and a third example for the second group of detector units.

DETAILED DESCRIPTION OF THE EXAMPLE EMBODIMENTS

Figure 1:
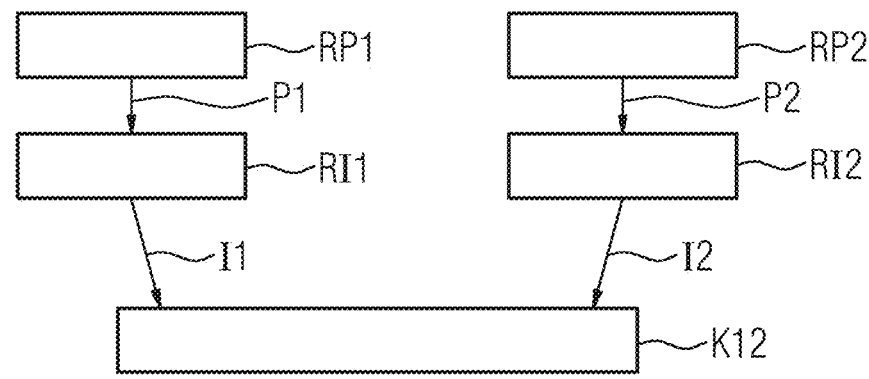
FIG. 1 shows a flowchart of a method for generating an image according to a first embodiment of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In the inventive method of at least one embodiment for generating an image a first projection data set is detected via a first group of detector units and a second projection data set detected via a second group of detector units. The first group has a first plurality of first detector units, wherein the first detector units each have more than a given number of detector elements. The second group has a second plurality of second detector units, wherein the second detector units each have, at most, the given number of detector elements. First image data is reconstructed based on the first projection data set. Second image data is reconstructed based on the second projection data set. The first image data and the second image data are combined. In particular, the first image data and the second image data are combined to form the image.

The first projection data set and the second projection data set can relate, for example, to radiation quanta of radiation which, starting from a radiation source, is projected onto detector units and in the process penetrates a region of the object that is to be mapped. The first projection data set and the second projection data set can include, for example, information about an interaction of the radiation with the object, in particular an attenuation of the radiation by the object.

A projection data set can comprise one or more projection profile(s). An arrangement of a radiation source and/or detector units in respect of the region of the object to be mapped can be assigned, in particular is assigned, to each of these projection profiles respectively. An arrangement of this kind can be defined for example by an angle of rotation of a rotor, on which the radiation source and/or the detector units are arranged so as to rotate about the region of the object to be mapped.

One embodiment of the invention provides that the first projection data set and the second projection data set are detected simultaneously. One embodiment of the invention provides that the first projection data set is provided directly by the first group of detector units and that the second projection data set is provided directly by the second group of detector units.

Since the first detector units each have more than a given number of detector elements a first projection data set can be implemented with improved spectral quality compared to the second projection data set. Since the second detector units each have, at most, the given number of detector elements, a second projection data set can be implemented with improved spatial resolution compared to the first projection data set.

First or second image data can be reconstructed from the first or second projection data set respectively using the same reconstruction method or different reconstruction methods, for example, on the basis of a filtered back projection. In particular, the second image data can be reconstructed using a different reconstruction method to reconstruction of the first image data. For example, information, which is based on the first image data, can be used for reconstruction of the second image data.

Combining the first image data and the second image data can, in particular, comprise the pixel-by-pixel execution of a mathematical operation. A mathematical operation can, in particular, comprise one or more basic arithmetic operations, for example, adding and/or multiplying. Combining can in particular include filtering the first image data and/or filtering the second image data. The mathematical operation can relate, for example, to a value of a pixel of the first image data or the filtered first image data and a value of a pixel of the second image data or filtered second image data.

The first image data and the second image data can be combined, for example, with the aid of what is known as a frequency-split method.

According to an example embodiment of the invention, the first image data is filtered via a first filter and the second image data via a second filter, wherein the filtered first image data and the filtered second image data are added pixel-by-pixel.

In this way the first image data and the second image data are combined as a function of the spatial frequencies of the first image data and the spatial frequencies of the second image data. This should, in particular, be taken to mean that for a first spatial frequency range image information from the first image data is weighted more strongly relative to image information from the second image data, and for a second spatial frequency range image information from the second image data is weighted more strongly relative to image information from the first image data.

In this way an image of the object can be generated, wherein the image in the first spatial frequency range has image information which is based substantially on the first projection data set, and in the second spatial frequency range has image information which is based substantially on the second projection data set. An image can be attained thereby in which the improved spectral quality of the first detector units and the improved spatial resolution of the second detector units are combined.

According to an example embodiment of the invention, the first filter has a first transfer function and the second filter has a second transfer function, wherein the total of the first transfer function and the second transfer function is a constant function.

The boundary condition can thereby be met that for the notional case of identical first and second image data, the combined image data is identical to the first and second image data.

According to an example embodiment of the invention, the first filter has a low pass filter and the second filter a high pass filter.

One embodiment of the invention provides that the first filter is a low pass filter is and/or that the second filter is a high pass filter.

In particular, the high pass filter and the low pass filter can be complementary to each other such that the total of the Fourier transformation of the high pass filter and the Fourier transformation of the low pass filter is substantially constant. The boundary condition can also be met in this way.

An image of the object can be generated thereby, wherein, in a region of deeper spatial frequencies, i.e. coarser structures, the image has information having an improved spectral quality, and in a region of higher spatial frequencies, i.e. finer structures, has image information having an improved spatial resolution.

The first image data and back projection data based on the second projection data set can be combined, for example with the aid of what is known as an HYPR method (Highly Constrained Backprojected Reconstruction). The first image data can form what is known as a prior image in this connection. A method of this kind is known, for example, from U.S. Pat. No. 7,545,901 B2, the entire contents of which are incorporated herein by reference.

According to an example embodiment of the invention, the first image data and the second image data are multiplied pixel-by-pixel.

According to an example embodiment of the invention, the second image data is reconstructed in that back projection data based on the second projection data set is generated, wherein a back projection path can be assigned, in particular is assigned, to a pixel of the back projection data. The back projection data is normalized, wherein information based on a pixel group is used for the pixels of the back projection data, wherein the pixel group comprises pixels of the first image data which can be assigned, in particular are assigned, to the back projection path. The normalized back projection data is added pixel-by-pixel.

Back projection data can be generated using a back projection method based on the second projection data set.

The second image data reconstructed in this way and the first image data are preferably combined in that the first image data and the second image data are multiplied pixel-by-pixel.

An image of the object can thereby be generated such that for a region of deeper spatial frequencies, i.e. coarser structures, information from the first projection data set can be weighted more strongly relative to information from the second projection data set and for a region of higher spatial frequencies, i.e. finer structures, information from the second projection data set can be weighted more strongly relative to information from the first projection data set. In a region of deeper spatial frequencies, i.e. coarser structures, the image generated in this way has image information having an improved spectral quality and in a region of higher spatial frequencies, i.e. finer structures, has image information having improved spatial resolution.

As a rule, reduced spatial resolution is less disadvantageous in coarser structures and reduced spectral quality is less disadvantageous in finer structures. The invention therefore enables generation of an image having improved spatial resolution and improved spectral quality overall.

A given pixel of the first image data can, in particular, then be designated as being assignable to the back projection path if it corresponds to a pixel of the back projection data, wherein the value of the pixel of the back projection data is determined at least partially by a back projection along the back projection path. Corresponding pixels should, in particular, be taken to mean pixels relating to the same position in respect of a region of an object to be mapped.

According to an example embodiment of the invention, the value of the pixel of the back projection data is divided by the total of the values of the pixels of the pixel group.

In particular, normalizing of the back projection data can include dividing the value of the pixels of the back projection data by the total of the values of the pixels of the pixel group.

The value Rlmn of the pixel of the normalized back projection data can be calculated, for example, according to $$R_{lmn} = P_{lm}/\Sigma_n A_{mn} \quad (1)$$

The value $C_{mn}$ of the generated image can be calculated, for example, according to $$C_{mn} = A_{mn} \Sigma_l R_{lmn} \quad (2)$$

$P_{lm}$ stands for the value which is based on the second projection data set and is back-projected on the back projection path in order to generate back projection data. $A_{mn}$ stands for the values of the pixels of the pixel group. $A_{mn}$ stands, in particular, for the values of the pixels of the first image data which can be assigned to the back projection path. The index 1 relates to a projection profile of the second projection data set, wherein the pixel can be assigned to the projection profile. The index m relates to the back projection path. The index n relates to the position of pixels of the back projection data or of pixels of the first image data in respect of the back projection path.

A value of a pixel can relate, in particular, to an attenuation of a flux density of radiation quanta. It would, however, also be conceivable for the value of the pixel to alternatively or additionally relate to further interactions of radiation quanta with the object, for example a phase shift.

The first detector units can each have a plurality of detector elements. The second detector units can each have one or more detector elements. The given number can be, for example, one, four, nine or sixteen.

For example, the first group of detector units can have at least one third detector unit, wherein the first plurality of first detector units does not have the at least one third detector unit. For example, the second group of detector units can have at least one fourth detector unit, wherein the second plurality of second detector units does not have the at least one fourth detector unit.

For example, the first group can have one or more detector unit(s) which, at most, has/have the given number of detector elements. For example, the second group can have one or more detector unit(s) which has more than the given number of detector elements.

One embodiment of the invention provides that the first group of detector units comprises the first plurality of first detector units.

One embodiment of the invention provides that the second group of detector units comprises the second plurality of second detector units.

One embodiment of the invention provides that the first projection data set is detected via the first plurality of first detector units and that the second projection data set is detected via the second plurality of second detector units.

One embodiment of the invention provides that the first detector units each have a first number of detector elements and that the second detector units each have a second number of detector elements. The first number can be, for example, nine or sixteen. The second number can be, for example, one or four.

One embodiment of the invention provides that the detector units each have a given number of rows of detector elements, wherein each of the rows has a given number of columns of detector elements. The number of columns is preferably equal to the number of rows. The number of columns and/or the number of rows can be, for example one, two, three or four.

One embodiment of the invention provides that the first detector units each have a plurality of detector elements and that the second detector units each have exactly one detector element. In this way the first detector units can form macropixels and the second detector units subpixels.

The detector elements are, in particular, each designed to provide a first electrical signal, for example a quantity of electricity, as a function of incidence of a radiation quantum on the respective detector element.

A given detector unit has, in particular, then a given detector element if a second electrical signal which can be assigned or is assigned to the given detector unit is provided as a function of incidence of a radiation quantum on the given detector element. This can be achieved, for example, by a processing stage, by way of which a second electrical signal can be provided for each detector unit respectively. A processing stage of this kind is preferably designed such that the second electrical signal is provided as a function of the first electrical signals of the detector elements which the respective detector unit has. The processing stage can have components designed in the form of software. Alternatively or additionally, the processing stage can have components designed in the form of hardware.

If a quantity of electricity can be assigned or is assigned to each of the first electrical signals of the detector elements, which a given detector unit has, for example, the total of these quantities of electricity can be assigned to the second electrical signal of the given detector unit. The wording that a detector element is assigned to a detector unit will be used below synonymously with the wording that the detector unit comprises the detector element.

According to an example embodiment of the invention, a given detector element can optionally be assigned, in particular is assigned, to a first detector unit or a second detector unit or both a first detector unit and a second detector unit. A given detector element can preferably be assigned, in particular is assigned, to a plurality of first detector units, a plurality of second detector units or both a plurality of first detector units and a plurality of second detector units.

For this purpose the processing stage can have a device for dividing and/or a device for duplicating a first electrical signal of a detector element. Furthermore, the processing stage can be designed such that parts and/or copies of the first electrical signal of a given detector element are processed on processing branches, wherein at least one processing branch is assigned to each detector unit which has the given detector element.

A detector unit preferably has a plurality of adjacent detector elements. It would, however, also be conceivable to assign mutually spaced apart detector elements to one detector unit. An assignment of detector elements to first detector units and second detector units can be fixed. It would also be conceivable for the assignment of detector elements in particular to first detector units and second detector units to be set in accordance with the needs of the user and/or the requirements of the examination, for example via an assignment stage.

The assignment stage can have components designed in the form of software. Alternatively or additionally, the assignment stage can have components designed in the form of hardware.

According to an example embodiment of the invention, the first detector units and/or the second detector units are each designed for spectrally resolved detection of radiation quanta. One embodiment of the invention provides that the first detector units and/or the second detector units are designed for quantum-counting detection of radiation quanta. In particular, the detector elements can be designed for quantum-counting detection of radiation quanta.

Spectrally resolved detection, for example quantum-counting detection, of radiation quanta should, in particular, be taken to mean that the first electrical signal or the second electrical signal is provided as a function of the energy of the incident radiation quantum. The incident radiation quantum can thereby be assigned to one of a plurality of given energy range(s) respectively. In this way a first projection data set and a second projection data set respectively can be detected for each of the plurality of given energy ranges.

According to an example embodiment of the invention, the first detector units and/or the second detector units each have a spectral resolution, wherein the spectral resolution can be defined, in particular is defined, by the number of detector elements incorporated by the respective detector unit. The first detector units and/or the second detector units are preferably each designed such that the spectral resolution of a given detector unit improves with an increasing number of detector elements incorporated by the given detector unit.

According to an example embodiment of the invention, the first detector units and/or the second detector units each have a spatial resolution, wherein the spatial resolution can be defined, in particular is defined, by the number of detector elements incorporated by the respective detector unit. The first detector units and/or the second detector units are preferably each designed such that the spatial resolution of a given detector unit improves with a decreasing number of detector elements incorporated by the given detector unit.

An example embodiment of the invention enables, in particular, an image simultaneously having high spatial resolution and good spectral separation to be generated from data from a quantum counting detector which has the first group of detector units and the second group of detector units.

One embodiment of the invention provides that the first detector units each have a projection surface which projection surface is larger than a given surface value, and that the second detector units each have a projection surface, which projection surface is, at most, as large as the given surface value. A projection surface of a detector unit or detector element should, in particular, be taken to mean the surface which is provided and/or designed for the incidence of radiation quanta for the purpose of detecting a projection data set.

One embodiment of the invention provides that the projection surface of a given detector unit is formed by the projection surfaces of the detector elements presented by the given detector unit and/or is equal to the total of the projection surfaces of the detector elements presented by the given detector unit.

An example embodiment of the data processing unit has a first group of detector units, a second group of detector units, a reconstruction unit and a combination unit. The first group of detector units is designed for detecting a first projection data set. The first group has a first plurality of first detector units, wherein the first detector units each have more than a given number of detector elements, wherein the first detector units are each designed for spectrally resolved detection of radiation quanta. The second group of detector units is designed for detecting a second projection data set. The second group has a second plurality of second detector units, wherein the second detector units each have, at most, the given number of detector elements, wherein the second detector units are each designed for spectrally resolved detection of radiation quanta. The reconstruction unit is designed for reconstructing first image data based on the first projection data set and for reconstructing second image data based on the second projection data set. The combination unit is designed for combining the first image data and the second image data.

One embodiment provides that the combination unit has a first filter, a second filter and an adding unit. The first filter is designed for filtering the first image data. The second filter is designed for filtering the second image data. The adding unit is designed for pixel-by-pixel addition of the filtered first image data and filtered second image data.

According to an example embodiment of the invention, the reconstruction unit has a back projection unit, a normalizing unit and an adding unit auf. The reconstruction unit is designed for generating back projection data based on the second projection data set, wherein a back projection path can be assigned, in particular is assigned, to a pixel of the back projection data. The normalizing unit is designed for normalizing the back projection data, wherein information based on a pixel group is used for the pixel of the back projection data, wherein the pixel group comprises pixels of the first image data which can be assigned, in particular are assigned, to the back projection path. The adding unit is designed for pixel-by-pixel addition of the normalized back projection data.

One embodiment provides that the normalizing unit has a dividing unit, wherein the dividing unit is designed for dividing the value of the pixel of the back projection data by the total of the values of the pixels of the pixel group.

According to an example embodiment of the invention, the data processing unit is designed for carrying out an example embodiment of the inventive method.

An example embodiment of the invention therefore enables an image having improved spatial resolution and improved spectral quality to be generated on the basis of the first projection data set and the second projection data set.

An example embodiment of the inventive imaging device has a radiation source, a detector and an inventive data processing unit.

According to an embodiment of the invention, the detector has the first group of detector units and the second group of detector units. According to an embodiment of the invention the detector has a plurality of detector elements.

One embodiment of the invention provides that the method comprises the following steps:

detecting a first projection data set via a first group of detector units of a detector, wherein the first group has a first plurality of first detector units of the detector, wherein the first detector units of the detector each have more than a given number of detector elements of the detector, detecting a second projection data set via a second group of detector units of the detector, wherein the second group has a second plurality of second detector units of the detector, wherein the second detector units of the detector each have, at most, the given number of detector elements of the detector, reconstructing first image data based on the first projection data set, reconstructing second image data based on the second projection data set, and combining the first image data and the second image data.

According to an embodiment of the invention the detector is the detector of a single-source computer tomograph. In particular, the inventive imaging device can be a single-source computer tomograph.

According to a further embodiment of the invention the inventive imaging device has a first radiation source, a first detector interacting with the first radiation source, a second radiation source, a second detector interacting with the second radiation source and an inventive data processing unit. In particular, the inventive imaging device can be a dual-source computer tomograph.

According to one embodiment of the invention, it is provided that the first detector has the first group of detector units and/or that the second detector has the second group of detector units. According to one embodiment of the invention it is provided that the first detector has a plurality of detector elements and/or that the second detector has a plurality of detector elements.

According to one embodiment of the invention, a computer program product has a computer program which can be loaded directly into a data processing unit of an imaging device, having program sections in order to carry out all steps of an embodiment of the inventive method when the computer program is run in the data processing unit.

Program sections which can be read and executed by a data processing unit are stored on the inventive computer-readable medium in order to carry out all steps of an embodiment of an inventive method when the program sections are executed by the data processing unit.

According to an embodiment of the invention, the imaging device is chosen from the group comprising a computer tomograph, a single-photon emission computer tomograph (SPECT device), a positron emission tomography (PET device), a magnetic resonance tomograph and combinations thereof. In particular, the medical imaging device can have an X-ray apparatus, a C-arm X-ray apparatus, an ultrasound apparatus and the like. The imaging device can also be a combination of a plurality of imaging and/or irradiation modalities, for example, a PET-CT device or a SPECT-CT device. An irradiation modality can have, for example, an irradiation apparatus for therapeutic irradiation.

Within the context of the invention features which are described in relation to different embodiments and/or different claim categories (method, unit, etc.) can be combined to form further embodiments. In particular, the features, advantages and embodiments described in relation to the inventive method can also be transferred to the inventive data processing unit, inventive imaging device, inventive computer program product and inventive computer-readable and vice versa. In other words, the concrete claims can also be developed by the features which are described or claimed in connection with a method. The corresponding functional features of the method are formed by appropriate concrete modules, in particular by hardware modules.

FIG. 1 shows a flowchart of a method for generating an image according to a first embodiment of the invention.

In step RP1 a first projection data set P1 is detected via a first group G1 of detector units. In step RP2 a second projection data set P2 is detected via a second group G2 of detector units. The first group G1 has a first plurality of first detector units DET1, wherein the first detector units DET1 each have more than a given number of detector elements DEL. The second group G2 has a second plurality of second detector units DET2, wherein the second detector units DET2 each have, at most, the given number of detector elements DEL. In step RI1 first image data I1 is reconstructed based on the first projection data set P1. In step RI2 second image data I2 is reconstructed based on the second projection data set P2. In step K12 the first image data I1 and the second image data I2 are combined. In particular, the first image data I1 and the second image data I2 are combined in step K12 to form the image IF.

In the embodiments shown below substantially the differences from the embodiments illustrated above in each case are described. Substantially unchanging features, in particular method steps, are basically provides with identical reference numerals.

Figure 2:
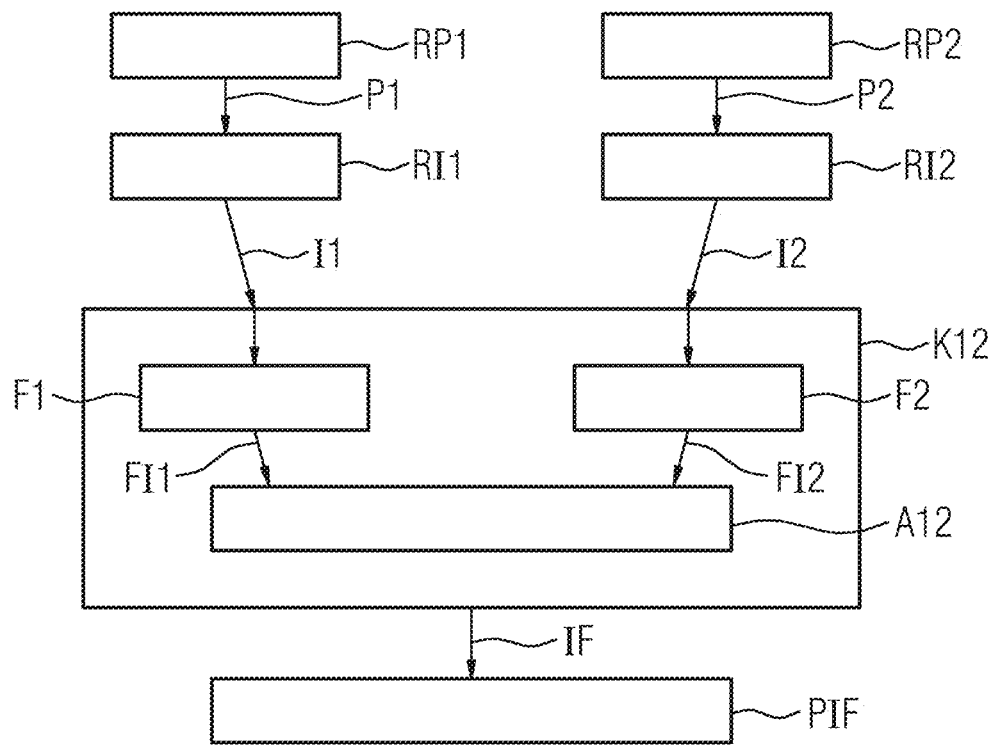
FIG. 2 shows a flowchart of a method for generating an image according to a second embodiment of the invention.

FIG. 2 shows a flowchart of a method for generating an image according to a second embodiment of the invention.

The second embodiment of the invention provides that step K12 includes steps F1, F2 and A12. In step F1 the first image data I1 is filtered via a first filter. In step F2 the second image data I2 is filtered via a second filter. In step A12 the filtered first image data FI1 and the filtered second image data FI2 are added pixel-by-pixel. In this way the filtered first image data FI1 and the filtered second image data FI2 are combined to form the image IF. In step PIF the image IF is supplied, for example for display and/or further processing.

Figure 3:
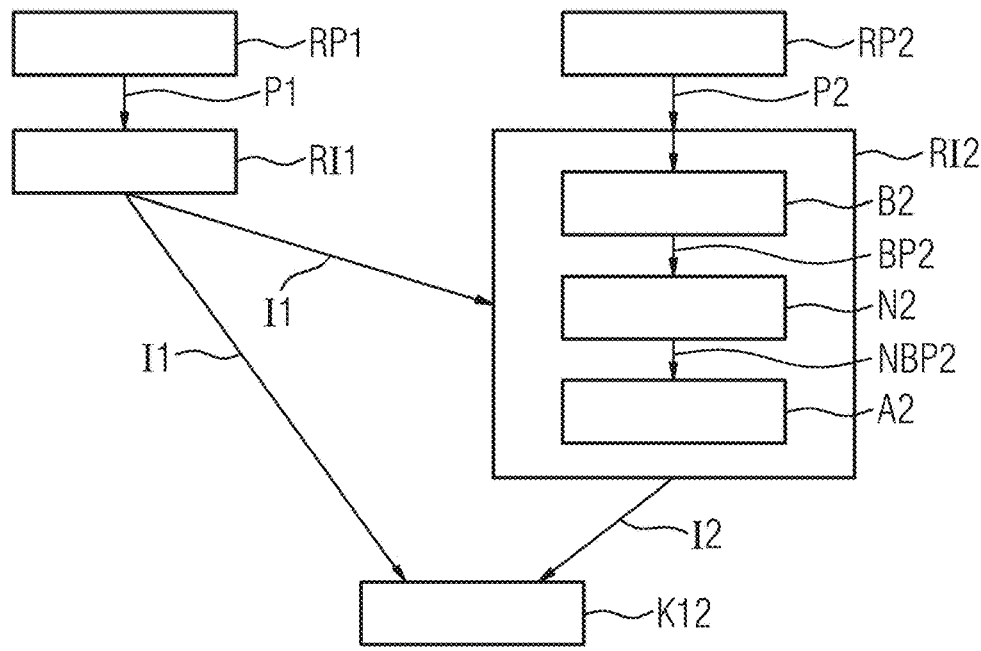
FIG. 3 shows a flowchart of a method for generating an image according to a third embodiment of the invention.

FIG. 3 shows a flowchart of a method for generating an image according to a third embodiment of the invention.

The third embodiment of the invention provides that step RI2 includes steps B2, N2 and A2. In step B2 back projection data BP2 based on the second projection data set P2 is generated, wherein a back projection path BPP can be assigned to a pixel PIX2 of the back projection data BP2. In step N2 the back projection data BP2 is normalized, wherein for the pixel PIX2 of the back projection data BP2 information based on a pixel group PG1 is used, wherein the pixel group PG1 comprises pixels of the first image data I1 to which back projection path BPP can be assigned, in particular is assigned. In step A2 the normalized back projection data NBP2 is added pixel-by-pixel.

Figure 4:
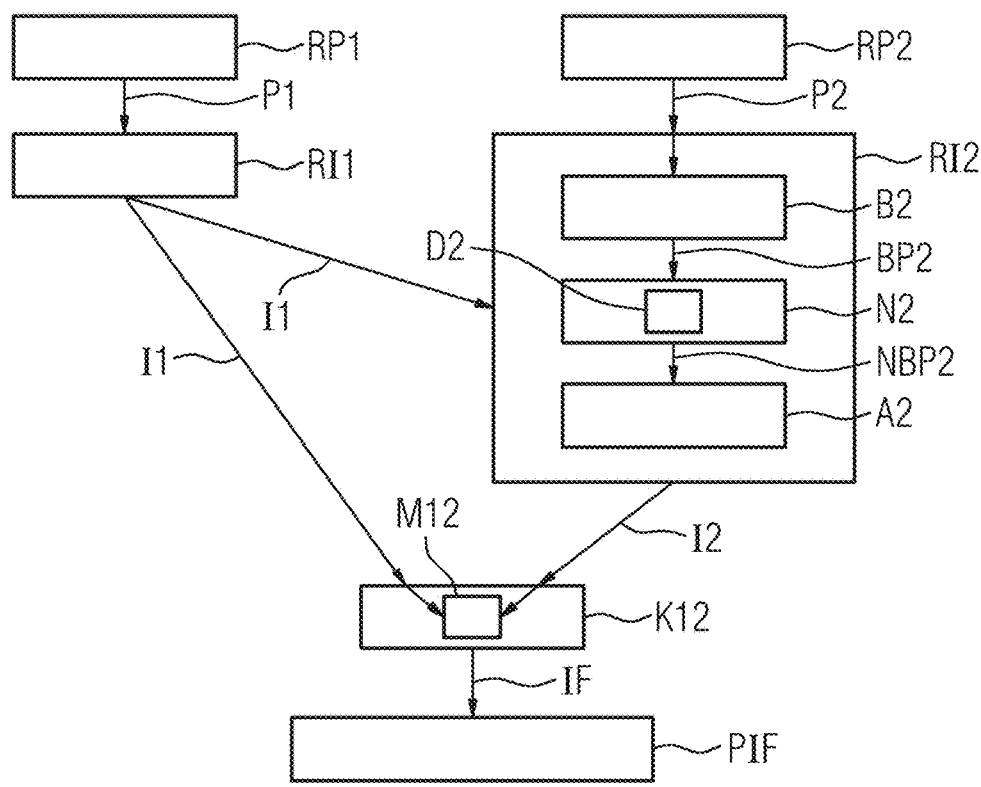
FIG. 4 shows a flowchart of a method for generating an image according to a fourth embodiment of the invention.

FIG. 4 shows a flowchart of a method for generating an image according to a fourth embodiment of the invention.

The fourth embodiment of the invention provides that step N2 includes step D2 and that step K12 includes step M12. In step M12 the first image data I1 and the second image data I2 are multiplied pixel-by-pixel. In step D2 the value of the pixel PIX2 of the back projection data BP2 is divided by the total of the values of the pixels of the pixel group PG1.

Figure 5:
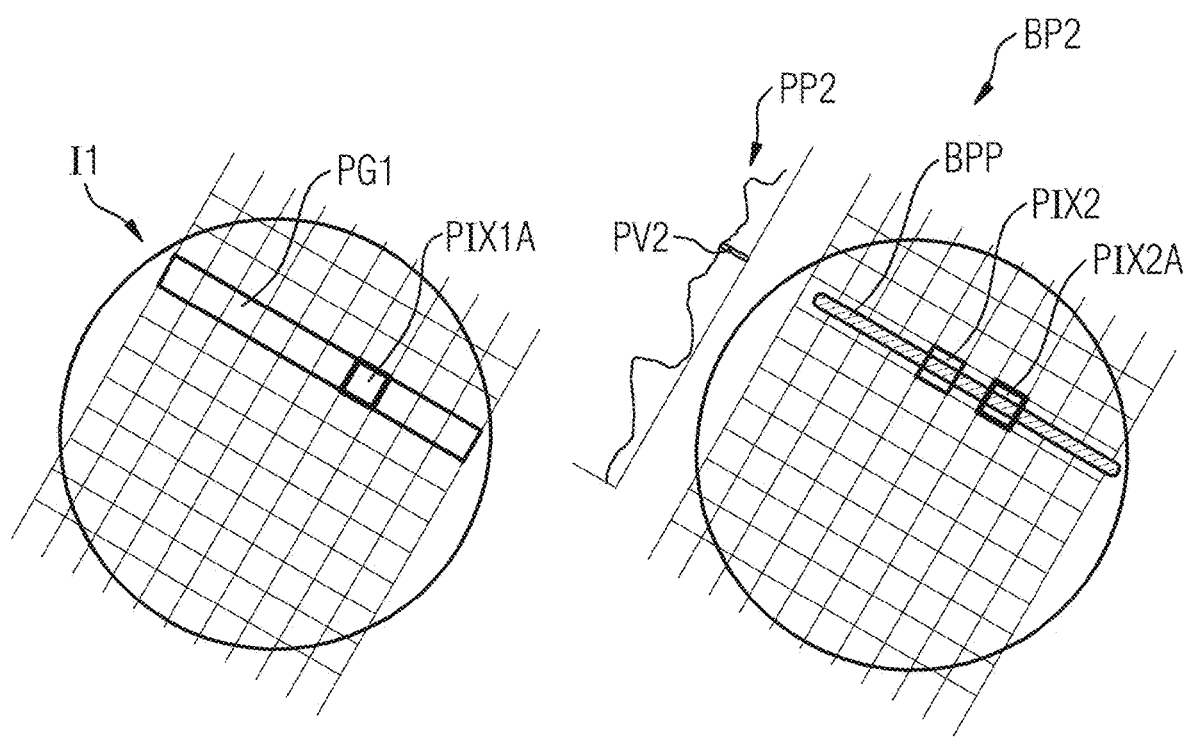
FIG. 5 shows an example for first image data and back projection data.

FIG. 5 shows an example for first image data I1 and back projection data BP2.

The back projection path BPP can be assigned, in particular is assigned, to the pixel PIX2 of the back projection data BP2. One criterion for this assignability or assignment is that the projection value PV2 of the projection profile PP2 of the projection data set P2 is back-projected along the back projection path BPP in order to determine the value of the pixel PIX2.

The pixel group PG1 comprises pixels of the first image data I1 which can be assigned, in particular are assigned, to the back projection path BPP. The pixel PIX1A of the first image data I1 can be assigned, in particular is assigned, to the back projection path BPP. It corresponds to the pixel PIX2A of the back projection data BP2, wherein the value of the pixel PIX2A of the back projection data BP2 is determined at least partly by a back projection along the back projection path BPP. The pixel PIX1A and the pixel PIX2A relate to the same position in respect of a region of an object to be mapped.

Figure 6:
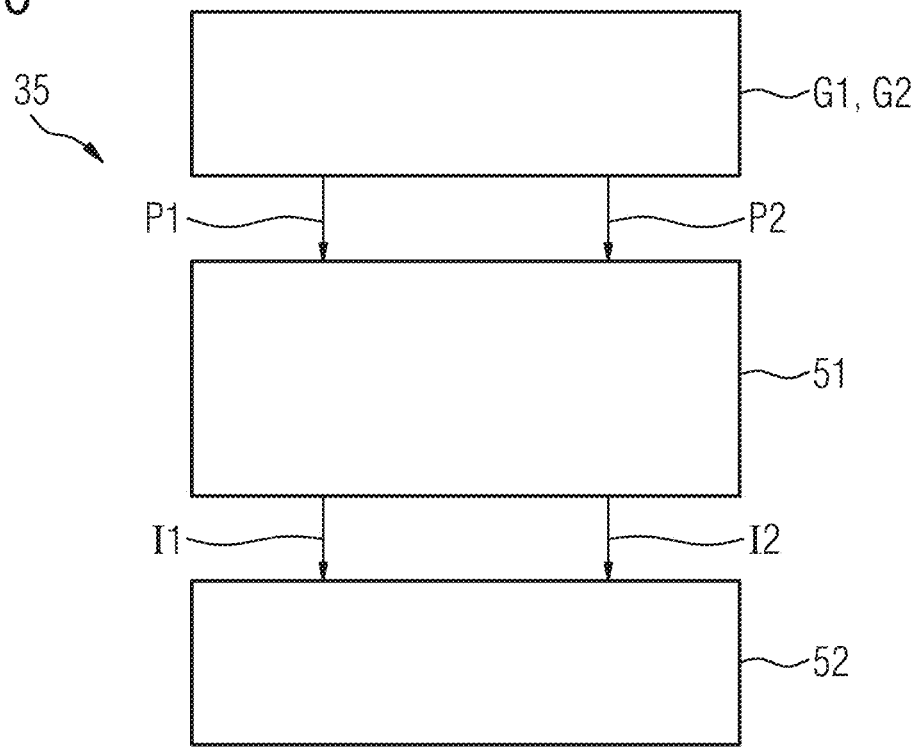
FIG. 6 shows a data processing unit according to a fifth embodiment of the invention.

FIG. 6 shows a data processing unit 35 according to a fifth embodiment of the invention.

The data processing unit 35 has a first group G1 of detector units, a second group G2 of detector units, a reconstruction unit 51 and a combination unit 52. The first group G1 of detector units is designed for detecting RP1 a first projection data set P1. The second group G2 of detector units is designed for detecting RP2 a second projection data set P2. The first group G1 has a first plurality of first detector units DET1, wherein the first detector units DET1 each have more than a given number of detector elements DEL. The second group G2 has a second plurality of second detector units DET2, wherein the second detector units DET2 each have, at most, the given number of detector elements DEL. The reconstruction unit 51 is designed for reconstructing first image data I1 based on the first projection data set P1 and for reconstructing second image data I2 based on the second projection data set P2. The combination unit 52 is designed for combining the first image data I1 and second image data I2.

Figure 7:
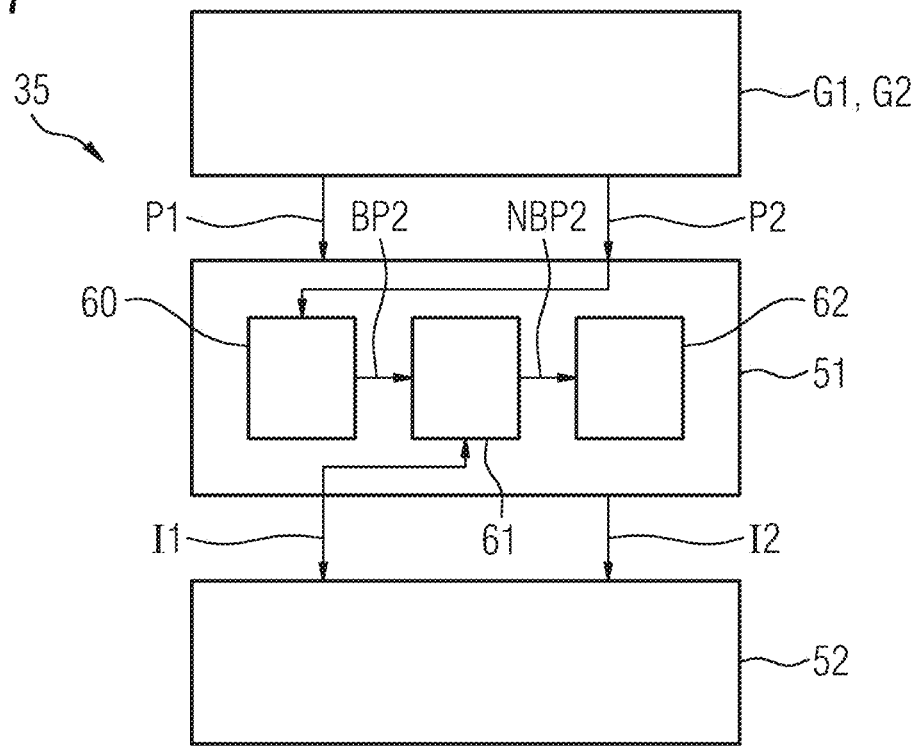
FIG. 7 shows a data processing unit according to a sixth embodiment of the invention.

FIG. 7 shows a data processing unit 35 according to a sixth embodiment of the invention.

The sixth embodiment of the invention provides that the reconstruction unit 51 has a back projection unit 60, a normalizing unit 61 and an adding unit 62. The back projection unit 60 is designed for generating back projection data BP2 based on the second projection data set P2, wherein a back projection path BPP can be assigned, in particular is assigned, to a pixel PIX2 of the back projection data BP2. The normalizing unit 61 is designed for normalizing N2 the back projection data BP2, wherein information based on a pixel group PG1 is used for the pixel PIX2 of the back projection data BP2, wherein the pixel group PG1 comprises pixels of the first image data I1 which can be assigned, in particular are assigned, to the back projection path BPP. The adding unit 62 is designed for pixel-by-pixel addition A2 of the normalized back projection data NBP2.

The data processing unit 35 is optionally designed for carrying out one or more method(s) according to a described embodiment of the invention.

Figure 8:
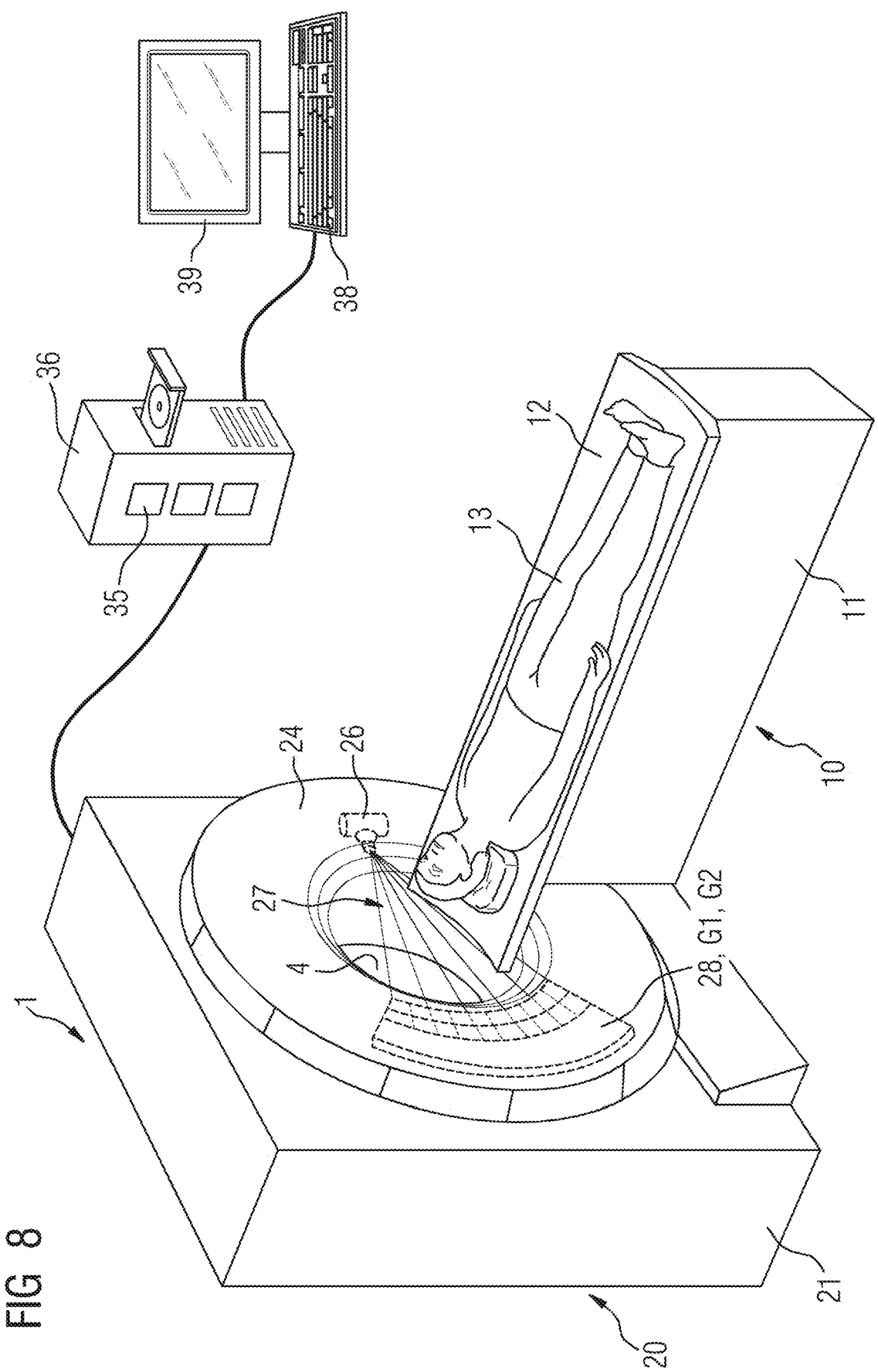
FIG. 8 shows an imaging device according to a seventh embodiment of the invention.

FIG. 8 shows an imaging device 1 according to a seventh embodiment of the invention.

A computer tomograph is shown, by way of example, for the imaging device 1, without limiting the general inventive idea.

The imaging device 1 has a gantry 20. The gantry 20 has a stationary support frame 21. The gantry 20 has a rotor 24 mounted so it can be rotated by a pivot bearing device. The imaging device 1 has an image recording region 4 formed by a tunnel-like opening. A region of an object to be mapped can be arranged in the image recording region 4.

The object shown in FIG. 8 is a patient 13. The imaging device 1 has a patient-positioning device 10. The patient-positioning device 10 has a positioning table 11 and a transfer plate 12 for positioning the patient 13. The transfer plate 12 is arranged on the positioning table 11 so it can be moved relative to the positioning table 11 such that the transfer plate 12 can be introduced into the image recording region 4 in a longitudinal direction of the transfer plate 12.

A radiation projection device 26, 28 is arranged on the rotor 24. The radiation projection device 26, 28 has a radiation source 26 which is designed to emit radiation quanta, and a detector 28 which is designed for detection of radiation quanta. The radiation quanta 27 can pass from the radiation source 26 to the region to be mapped and, following an interaction with the region to be mapped, strike the detector 28. In this way a projection profile of the region to be mapped can be detected.

At least one projection profile respectively can be detected for different arrangements of the radiation source 26 and the detector in respect of the region of the object to be mapped by rotation of the radiation projection device 26, 28 about the image recording region. A plurality of projection profiles can form a projection data set. A tomographic image of the region to be mapped can be reconstructed on the basis of a projection data set.

The imaging device 1 has a control device 36 for controlling the imaging device 1. The imaging device 1 also has an input unit 38 for inputting control information, for example, imaging parameters, and examination parameters and an output unit 39 for outputting control information and images, in particular an inventively generated image.

The detector 28 has detector elements DEL. The detector elements DEL form a first group G1 of detector units and a second group G2 of detector units. The imaging device 1 has a data processing unit according to one embodiment of the invention, for example the data processing unit 35 shown in FIG. 6 and/or FIG. 7, wherein the data processing unit has the first group G1 of detector units and the second group G2 of detector units.

FIG. 9 shows a first example G11, a second example G12 and a third example G13 for the first group G1 of detector units. FIG. 9 shows, in particular, the assignment of the detector elements DEL in respect of the first group G1 and first detector units DET1.

FIG. 10 shows a first example G21, a second example G22 and a third example G23 for the second group G2 of detector units. FIG. 10 shows, in particular, the assignment of the detector elements DEL in respect of the second group G2 and second detector units DET2.

FIG. 10 shows the same detector elements DEL as FIG. 9. The detector elements DEL shown in FIG. 9 and FIG. 10 form an array having a plurality if adjacent rows, wherein each of the rows has a plurality of adjacent detector elements DEL.

The first groups G11, G12, G13 each have a first plurality of first detector units DET1, wherein the first detector units DET1 each have more than a given number of detector elements DEL. The second groups G2 each have a second plurality of second detector units DET2, wherein the second detector units DET2 each have, at most, the given number of detector elements DEL. The first detector units DET1 and the second detector units DET2 are illustrated by hatched areas bordered by closed lines.

The first group G11 has a plurality of third detector units DET3 which each have, at most, the given number of detector elements DEL. The second group G21 has a fourth detector unit DET4 which comprises more than the given number of detector elements DEL. The third detector units DET3 and the fourth detector unit DET4 are illustrated by hatched areas bordered by broken lines. The first group G12 comprises the first plurality of first detector units DET1. The second group G22 comprises the second plurality of second detector units DET2. In the first group G13 the first detector units DET1 each have nine detector elements DEL. In the second group G23 the second detector units DET2 each have one detector element DEL.

The detector elements DEL shown in FIG. 9 and FIG. 10 can optionally be assigned, in particular are assigned, to both a first detector unit DET1 and a second detector unit DET2.

One or more of the detector element(s) DEL shown in FIG. 9 and FIG. 10 can optionally be assigned, in particular is/are assigned, to a plurality of first detector units DET1 and to a plurality of second detector units DET2. For example, the detector element DELX is assigned to a plurality of first detector units DET1 and to a plurality of second detector units DET2.

The assignment of detector elements DEL in particular to first detector units DET1 and second detector units DET2 can optionally be set in accordance with the needs of the user and/or the requirements of the examination, for example via an assignment stage. For example, the assignment in a first operating state of the assignment stage can produce the first group G11 and the second group G21, in a second operating state of the assignment stage the first group G12 and the second group G12, and in a third operating state of the assignment stage the first group G13 and the second group G23.

Reference is made to the fact that the use of the indefinite article "a" or "an" does not prevent the relevant features from also being present multiple times. Similarly, the term "unit" does not prevent this from comprising a plurality of components which may optionally also be spatially distributed.

Reference is made to the fact that the described methods and the described data processing unit as well as the described imaging device are merely preferred example embodiments of the invention and that the invention can be varied by a person skilled in the art, without departing from the scope of the invention provided it is specified by the claims.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for generating an image, comprising:
   detecting a first projection data set via a plurality of first detector units, the plurality of first detector units each including more than a given number of detector elements, wherein the plurality of first detector units are each configured to detect the first projection data set based on spectrally resolved detection of radiation quanta;
   detecting a second projection data set via a plurality of second detector units, the plurality of second detector units each including, at most, the given number of detector elements, wherein the plurality of second detector units are each configured to detect the second projection data set based on spectrally resolved detection of radiation quanta, and wherein each of the detector elements is the same size, the plurality of first detector units and the plurality of second detector units each have a respective size based on a respective number of detector elements incorporated in each respective detector unit, and the plurality of first detector units have a larger size than the plurality of second detector units;

reconstructing first image data based on the first projection data set;

reconstructing second image data based on the second projection data set; and combining the first image data and the second image data.

2. The method of claim 1, wherein the first image data is filtered via a first filter and the second image data is filtered via a second filter, and the combining includes adding the filtered first image data and the filtered second image data pixel-by-pixel.

3. The method of claim 2, wherein the first filter includes a first transfer function and the second filter includes a second transfer function, a total of the first transfer function and the second transfer function being a constant function.

4. The method of claim 3, wherein the first filter includes a low pass filter and the second filter includes a high pass filter.

5. The method of claim 3, wherein at least one of the plurality of first detector units and the plurality of second detector units each correspond to a respective spatial resolution, the respective spatial resolution being defined by the respective number of detector elements incorporated in each respective detector unit.

6. The method of claim 2, wherein the first filter includes a low pass filter and the second filter includes a high pass filter.

7. The method of claim 2, wherein at least one of the plurality of first detector units and the plurality of second detector units each correspond to a respective spatial resolution, the respective spatial resolution being defined by the respective number of detector elements incorporated in each respective detector unit.

8. The method of claim 1, wherein the combining includes multiplying the first image data and the second image data pixel-by pixel.

9. The method of claim 1, wherein a detector element is assignable to one of the plurality of first detector units or one of the plurality of second detector units, or both one of the plurality of first detector units and one of the plurality of second detector units.

10. The method of claim 1, wherein at least one of the plurality of first detector units and the plurality of second detector units each correspond to a respective spectral resolution, the respective spectral resolution being defined by the respective number of detector elements incorporated in each respective detector unit.

11. The method of claim 1, wherein at least one of the plurality of first detector units and the plurality of second detector units each correspond to a respective spatial resolution, the respective spatial resolution being defined by the respective number of detector elements incorporated in each respective detector unit.

12. The method of claim 1, wherein the reconstructing second image data based on the second projection data set comprises:

generating back projection data based on the second projection data set, wherein a back projection path is assignable to a pixel of the back projection data;

normalizing the back projection data by dividing a value of the pixel of the back projection data by a total of values of pixels of the first image data assignable to the back projection path; and adding the normalized back projection data pixel-by-pixel.

13. The method of claim 1, wherein at least two of the plurality of first detector units have a different ratio of rows of the detector elements to columns of the detector elements.

14. The method of claim 13, wherein at least two of the plurality of second detector units have a different ratio of rows of the detector elements to columns of the detector elements.

15. The method of claim 1, wherein at least two of the plurality of second detector units have a different ratio of rows of the detector elements to columns of the detector elements.

16. A non-transitory computer readable medium, including program sections stored thereon, the program sections being readable and executable by a data processing unit to carry out the method of claim 1.

17. A non-transitory computer readable medium, including program sections stored thereon, the program sections being readable and executable by a data processing unit to carry out the method of claim 2.

18. A data processing unit communicatively coupled to a memory storing computer-readable instructions, the data processing unit being configured to execute the computer-readable instructions to:

detect a first projection data set using a plurality of first detector units, the plurality of first detector units each including more than a given number of detector elements, wherein the plurality of first detector units are each configured to detect the first projection data set based on spectrally resolved detection of radiation quanta;

detect a second projection data set using a plurality of second detector units, the plurality of second detector units each including, at most, the given number of detector elements, wherein the plurality of second detector units are each configured to detect the second projection data set based on spectrally resolved detection of radiation quanta, and wherein each of the detector elements is the same size, the plurality of first detector units and the plurality of second detector units each have a respective size based on a respective number of detector elements incorporated in each respective detector unit, and the plurality of first detector units have a larger size than the plurality of second detector units;

reconstruct first image data based on the first projection data set;

reconstruct second image data based on the second projection data set; and combine the first image data and the second image data to generate an image.

19. The data processing unit of claim 18, wherein the data processing unit is configured to execute the computer-readable instructions to reconstruct the second image data based on the second projection data set by generating back projection data based on the second projection data set, wherein a back projection path is assignable to a pixel of the back projection data;

normalizing the back projection data by dividing a value of the pixel of the back projection data by a total of values of pixels of the first image data assignable to the back projection path; and adding the normalized back projection data pixel-by-pixel.

20. An imaging device comprising:
the data processing unit of claim 18; and
at least one radiation source configured to provide radiation quanta to the plurality of first detector units and the plurality of second detector units.

* * * * *